US007025010B2

(12) United States Patent
Martin et al.

(10) Patent No.: US 7,025,010 B2
(45) Date of Patent: Apr. 11, 2006

(54) FLOW SPLITTER ARRANGEMENT FOR SERIES FED PRODUCT APPLICATION UNITS

(75) Inventors: Robert Wallace Martin, Parkview, IA (US); Nathan Albert Mariman, Geneseo, IL (US); Bradley John Meyer, Bismarck, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/828,840

(22) Filed: Apr. 21, 2004

(65) Prior Publication Data

US 2005/0235889 A1 Oct. 27, 2005

(51) Int. Cl.
*A01C 7/00* (2006.01)

(52) U.S. Cl. ........................................ 111/175; 111/177

(58) Field of Classification Search ................ 111/174, 111/177, 170, 77, 925, 175; 221/211, 203, 221/200

See application file for complete search history.

(56) References Cited

U.S. PATENT DOCUMENTS

| | | | | |
|---|---|---|---|---|
| 5,161,473 | A * | 11/1992 | Landphair et al. | 111/176 |
| 5,379,706 | A * | 1/1995 | Gage et al. | 111/175 |
| 5,392,722 | A * | 2/1995 | Snipes et al. | 111/174 |
| 6,047,652 | A | 4/2000 | Prairie et al. | |
| 6,298,797 | B1 * | 10/2001 | Mayerle et al. | 111/175 |
| 6,609,468 | B1 | 8/2003 | Meyer et al. | |
| 6,688,244 | B1 * | 2/2004 | Meyer et al. | 111/174 |
| 6,782,835 | B1 * | 8/2004 | Lee et al. | 111/174 |
| 6,845,724 | B1 * | 1/2005 | Mayerle et al. | 111/174 |

OTHER PUBLICATIONS

Case Corporation, Case IH Concord Air Till Drill Systems, 1996, (14 pages).
Case Corporation, Case IH 1200 Pivot-Transport Split Row Planter, (2 pages).
CNH, Two (2) photos of Flexi-Coil 9000.

* cited by examiner

*Primary Examiner*—Victor Batson
(74) *Attorney, Agent, or Firm*—The Law Office of Randall T. Erickson, P.C.

(57) ABSTRACT

A product-on-demand delivery system applies an agricultural product, such as seed, to a field. The system includes a frame that mounts a main hopper, a splitter fitting, a primary product hose, a secondary product hose, a primary application unit and a secondary application unit. The main hopper has an air nozzle wherein an air stream through the air nozzle entrains product within the air stream and delivers the air/product to the primary outlet hose. The splitter fitting has a splitter inlet flow-connected to the primary product hose and two splitter outlets flow-connected to the application units. The secondary application unit is coupled to the primary product supply hose by the secondary product hose connected at an outlet branch. The outlet branch is connected at an angle such that a product flow velocity vector in the primary product supply hose at the outlet branch is at an obtuse angle to a flow velocity vector of product flowing through the outlet branch. The outlet branch is oriented for a vertical upward flow of air and product.

18 Claims, 10 Drawing Sheets

FLOW SPLITTER ARRANGEMENT FOR SERIES FED PRODUCT APPLICATION UNITS

FIELD OF THE INVENTION

The present invention is directed to a product-on-demand delivery system having an improved nozzle assembly and seed or product distribution system.

BACKGROUND OF THE INVENTION

Pneumatic product-on-demand delivery systems have been used on agricultural seeding machines to automatically direct seed from a main seed hopper to a plurality of individual planting units. Each of the individual planting units has an auxiliary seed hopper for receiving the seed, a seed meter for metering the seed from the auxiliary seed hopper and a furrow opener for forming a planting furrow into which the metered seed is deposited. A fan is used to create pressurized air that forms an air stream on which the seed is taken to the planting units. These systems automatically replenish the auxiliary hoppers as needed.

The commercially available seed on demand delivery systems typically require a large fan to create the air stream. The large fan is required because of the pressure losses in the pneumatic system caused by abrupt changes in direction by the air stream in the main hopper.

Another system is described in U.S. Pat. No. 6,609,468, herein incorporated by reference. According to this patent, a product-on-demand delivery system is configured wherein the air stream passing through the main hopper is not subjected to the abrupt changes in direction.

The product-on-demand delivery system of the patent comprises a frame having a main hopper and an application unit. An air pump directs pressurized air to a manifold where the pressurized air is distributed to a plurality of air supply hoses. The air supply hoses are coupled to air inlets located on the bottom of the main hopper. Opposite the air inlets are corresponding product outlets for receiving the air streams with product, such as seed, entrained in the air stream. The product outlets are coupled to product supply hoses that are in turn coupled to auxiliary hoppers located on the application units. The bottom of the main hopper is concave and has outwardly diverging side walls. The air inlet is downwardly angled relative to the bottom and the product outlet is upwardly angled relative to the bottom.

Peaked baffles are located above corresponding air inlets and outlets so that product "puddles" form beneath the baffles. Gaps are formed between adjacent baffles so that product from the main hopper can flow into the product puddles.

The product-on-demand delivery system of this patent can be used to supply seed from a main seed hopper to auxiliary seed hoppers located on a planting unit. The planting unit would include auxiliary seed hoppers that each supply seed to a respective seed meter each of which directs metered seed to a planting furrow formed by a furrow opener.

According to the system described in U.S. Pat. No. 6,609,468, a separate product hose is connected between the main hopper and each auxiliary hopper.

The present inventors have recognized that on large machines, connecting a product hose from the main hopper to each auxiliary hopper results in an undesirable number of hoses, and an aggregate length of hose, on the machine. The present inventors have recognized the desirability of decreasing the complexity and number of product delivery hoses routed on a machine. The present inventors have also recognized that the distribution manifold mounted at the bottom of the main hopper also has a limited amount of space for the location of nozzles, particularly limiting when a separate nozzle is needed for each auxiliary application unit.

The present inventors have recognized that it would be desirable to provide a product-on-demand delivery system that includes a less costly and a less mechanically congested main hopper. The present inventors have recognized that it would be desirable to provide a main hopper which could be minimized in length and which could be connected to an optimal number of auxiliary product hoppers. The present inventors have recognized that it would be desirable to provide a product-on-demand delivery system that minimizes the required quantity of hose on the machine.

SUMMARY OF THE INVENTION

The invention provides an improved product-on-demand delivery system for applying an agricultural product, such as seed, to a field. The system includes a frame, a main hopper, a splitter fitting, a primary product hose, a secondary product hose, a primary application unit and a secondary application unit. The system can include multiples of the aforementioned components.

The main hopper is mounted on the frame. The main hopper has an air nozzle to which product in the main hopper is directed. An air stream through the air nozzle entrains product within the air stream. The splitter fitting has a splitter inlet flow-connected to the air nozzle and two splitter outlets. The primary application unit and the secondary application unit are both mounted to the frame. Each application unit is provided with a product meter for applying the product to a field. A first product meter of the primary application unit is coupled to the nozzle by the primary product supply hose. A second product meter of the secondary application unit is coupled to the primary product supply hose by the secondary product hose connected thereto at an outlet branch. The outlet branch is connected at an angle to the primary product conduit. Preferably, the angle is such that a product flow velocity vector in the primary product supply hose at the outlet branch is at an obtuse angle to a flow velocity vector of product flowing through the outlet branch. Also, it is preferred that the outlet branch is oriented for a vertical upward flow of air and product.

Preferably, each application unit includes an auxiliary product hopper located between the product hoses and each product meter. The product hopper allows each application unit to store a limited amount of product in close proximity to the respective product meter.

Preferably, the air nozzle is configured as a plurality of nozzles within a nozzle assembly as described in U.S. Pat. No. 6,609,468. An air pump is pneumatically coupled to the upstream sidewall of the nozzle assembly by an air supply hose, the air pump generating pressurized air directed into the air supply hose. The air supply hose has an air inlet that is coupled to the nozzle assembly opposite the product outlet, so that product located in the nozzle assembly is taken up by the air stream as the air stream passes from the air inlet of the air supply hose through the nozzle assembly to the product outlet. The air and product passes through the primary product supply hose, through the splitter fitting to the primary application unit and through splitter fitting and through the secondary product supply hose to the secondary application unit. Thus, air and product supplying both the primary and secondary application units is supplied through the primary product hose.

The nozzle assembly and main hopper can include an agitator assembly as described in U.S. Pat. No. 6,609,468.

The invention is particularly useful for applying seed to a field wherein a plurality of planting units are mounted to the frame. Each planting unit is provided with a seed meter for metering seed and a furrow opener for forming a planting furrow into which metered seed is deposited. A first seed meter is flow-coupled to the main seed hopper by a primary product supply hose, coupled to the downstream sidewall of the nozzle assembly. A second seed meter is flow-coupled to the primary product hose by a secondary product hose that branches from the primary product hose.

The present invention provides a Y-shaped tube structure that is plumbed to a source of product entrained pressurized air, to a primary auxiliary hopper and to a secondary auxiliary hopper. The Y-shaped tube structure is configured and oriented so that seed or other product delivered to the secondary auxiliary hopper is forced to slightly reverse flow and travel in a substantially vertical direction. The Y-shaped tube structure is arranged to cause the primary auxiliary hopper to be filled first with product and then the secondary auxiliary hopper to be filled second, without filling the product hose to the secondary auxiliary hopper so full of product that it plugs. The Y-shaped tube structure advantageously is in close proximity to the primary hopper to prevent plugs between the Y-shaped tube structure and the primary hopper. The product hose connected to the Y-shaped tube structure leading to the secondary hopper can be routed as needed to clear any other frame members or moving parts.

The Y-shaped tube structure can also have multiple outlets, each outlet feeding a separate hopper. The Y-shaped structures can also be "daisy chained" together to feed several hoppers in series.

The invention reduces the number of hoses and nozzles needed to feed a given number of planting rows. This also reduces the complexity of hose routing and expands the number of planting rows per machine. The hoses from the bulk or main hopper and manifold to primary and secondary auxiliary hoppers remains relatively empty, thereby preventing plugs. The invention also advantageously reduces the amount of seed present in the system when the machine is shut off. This reduces the cleaning time for switch-over to another product, such as to another type of seed.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
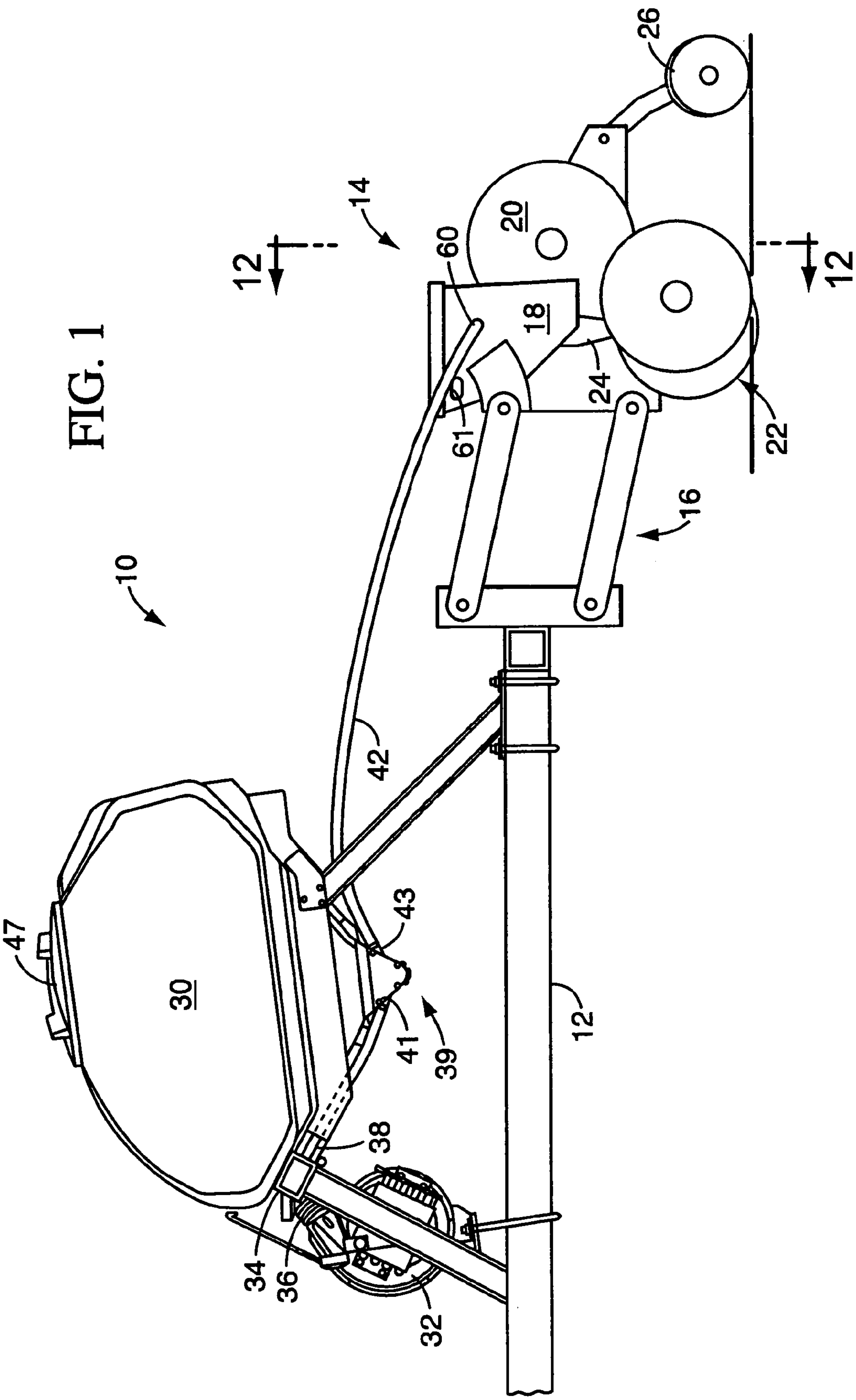
FIG. 1 is a side view of an agricultural planter using the subject product-on-demand delivery system.
Figure 2:
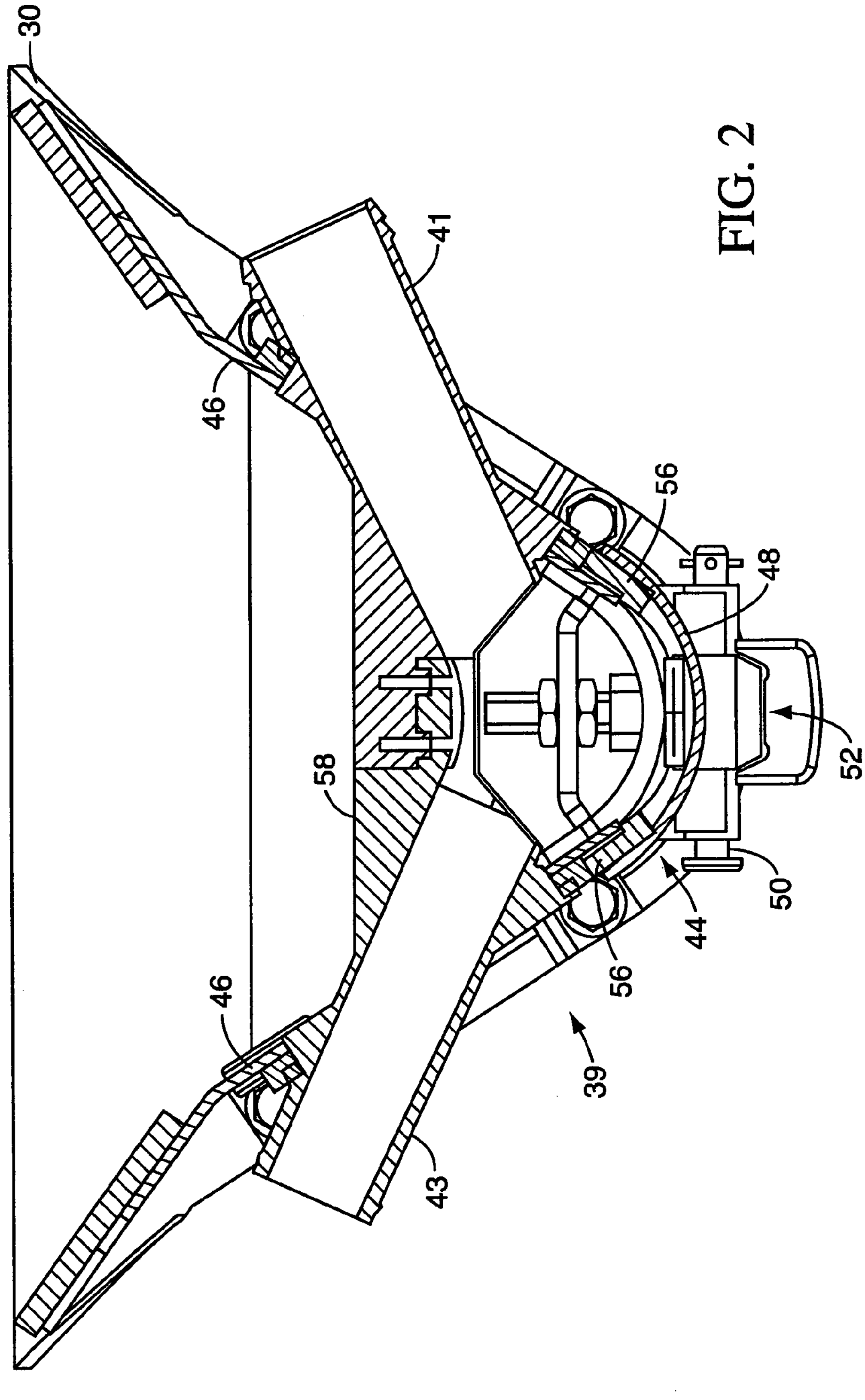
FIG. 2 is a side cross sectional view of the nozzle assembly of the product-on-demand delivery system.
Figure 3:
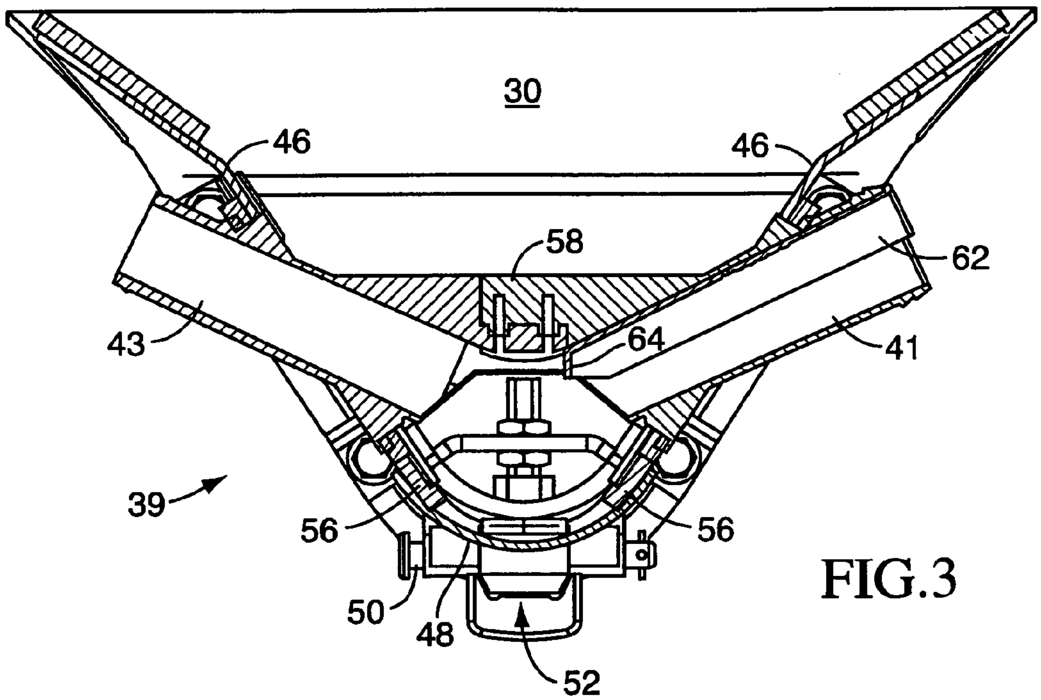
FIG. 3 is a side cross sectional view of the nozzle assembly of the product-on-demand delivery system having an air deflecting insert.
Figure 4:
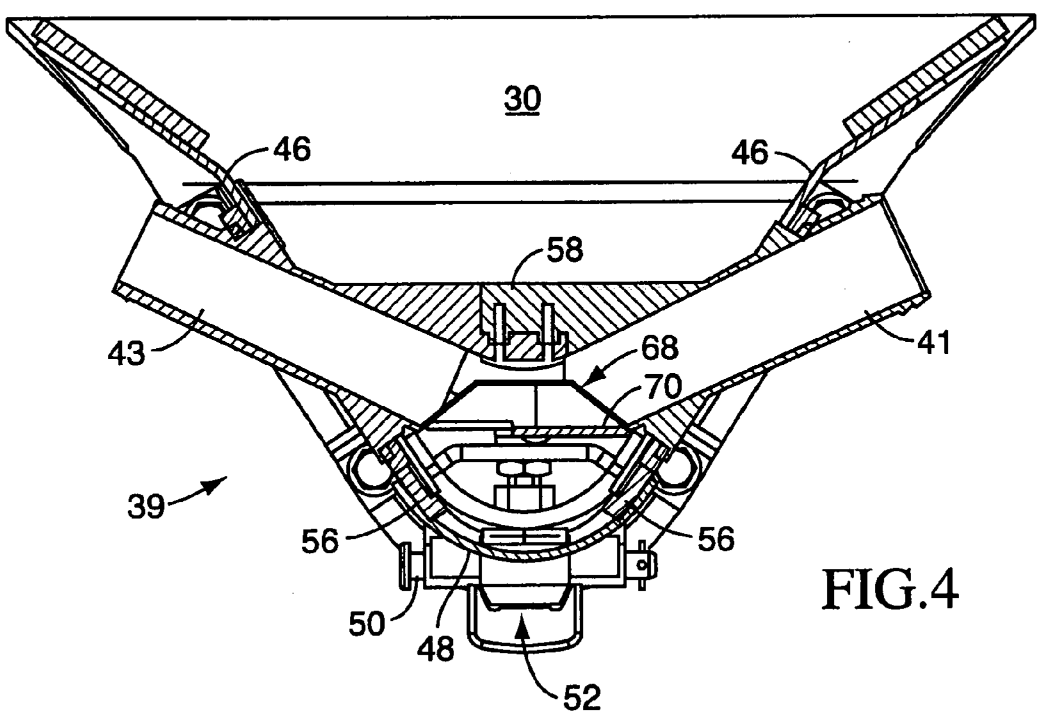
FIG. 4 is a side cross sectional view of the nozzle assembly of the product-on-demand delivery system having a product exposure limiting element.
Figure 5:
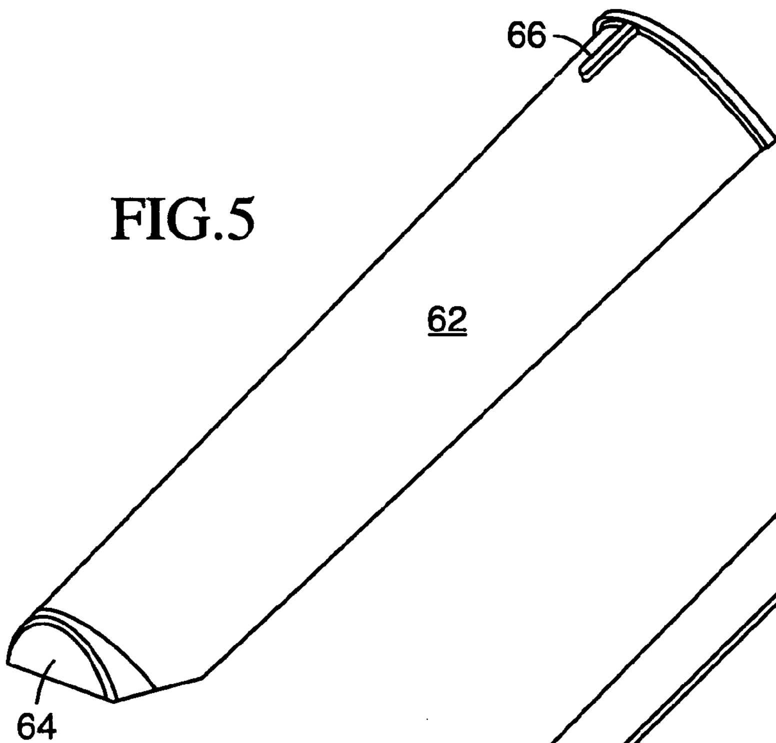
FIG. 5 is a top perspective view of the air deflecting insert.
Figure 6:
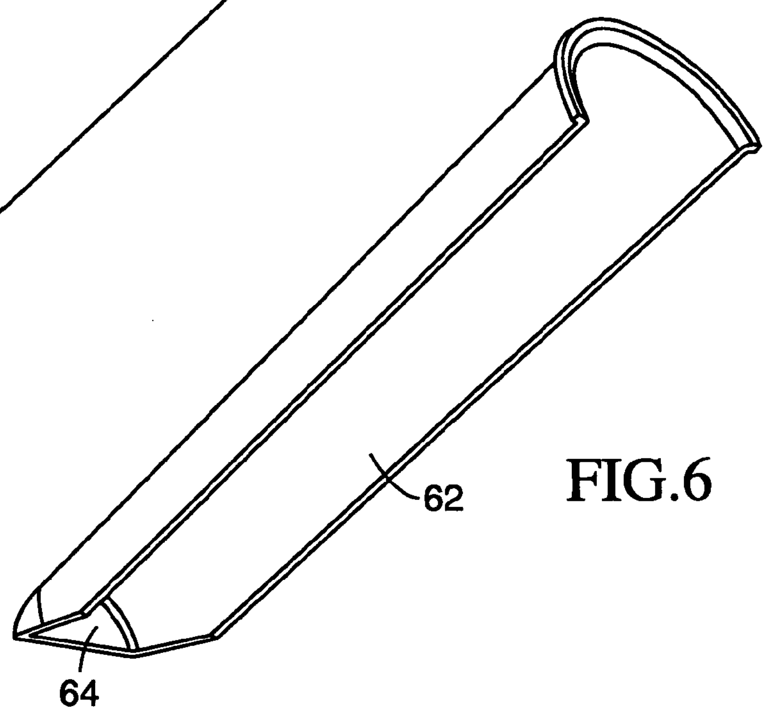
FIG. 6 is a bottom perspective view of the air deflecting insert.
Figure 7:
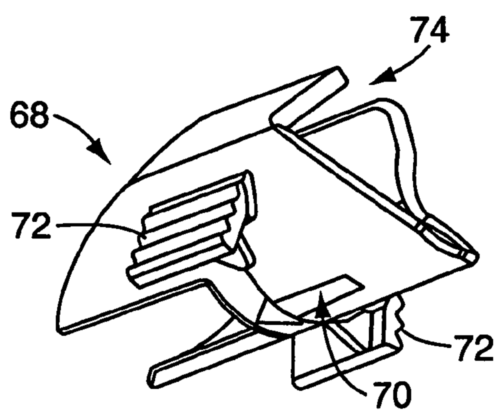
FIG. 7 is a bottom perspective view of the product exposure limiting element.
Figure 8:
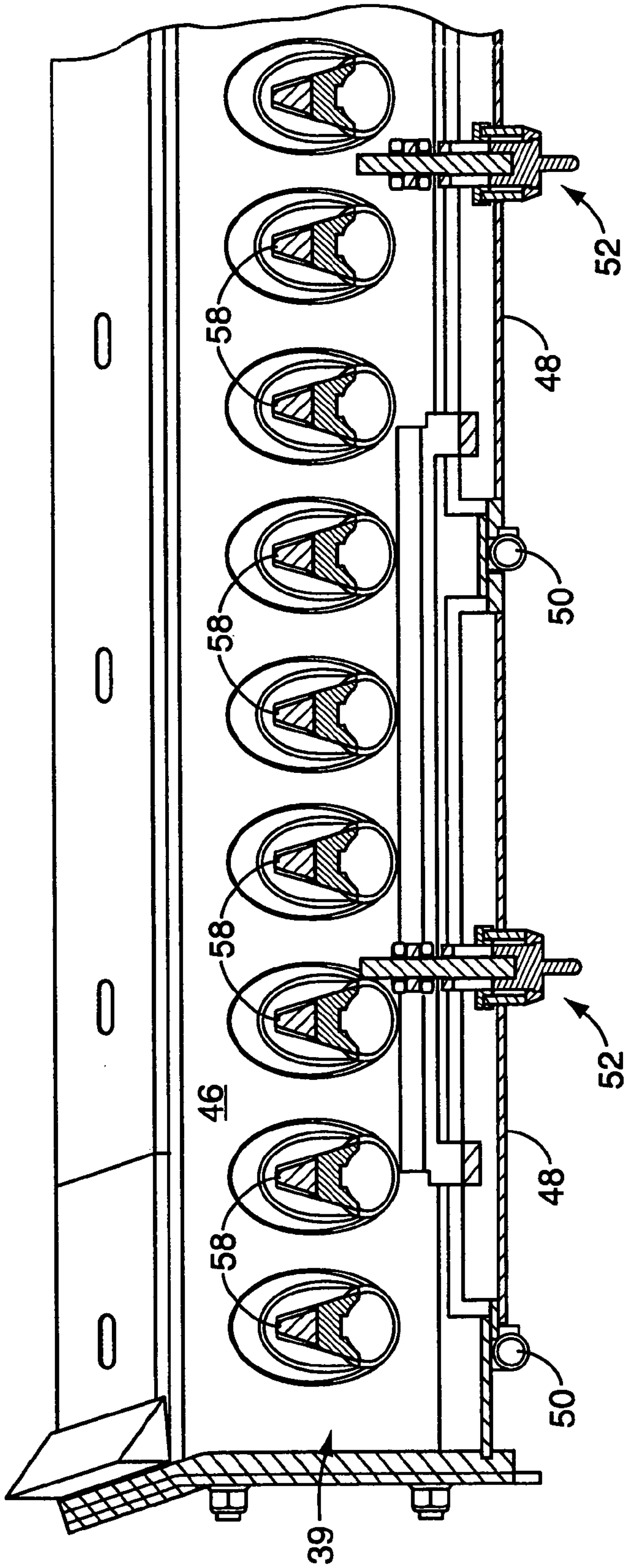
FIG. 8 is a front cross sectional view of the nozzle assembly of the product-on-demand delivery system.
Figure 9:
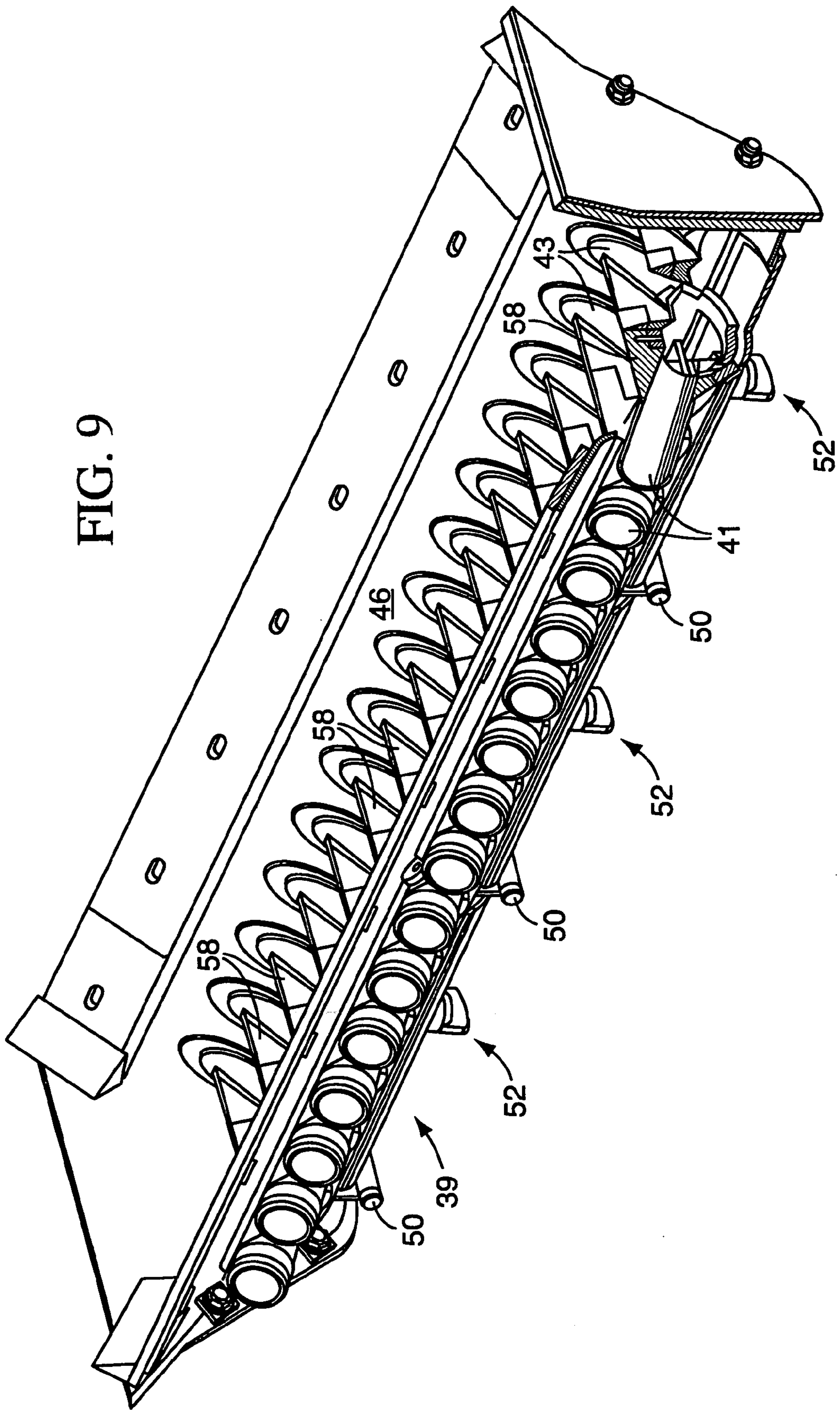
FIG. 9 is a front perspective and partial cross sectional view of the nozzle assembly of the product-on-demand delivery system.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An agricultural seeding machine 10 comprises a frame 12 on which are mounted a plurality of individual planting units 14. The planting units 14 are coupled to the frame 12 by a parallelogram linkage 16 so that the individual planting units 14 can move up and down to a limited degree relative to the frame 12. Each of the individual planting units comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter by a seed tube 24. A closing assembly 26 is used to close the planting furrow with the seed contained therein. In the preferred embodiment the seed meter 20 is a vacuum seed meter, although other types of seed meters using mechanical assemblies or positive air pressure could also be used with the subject invention. It should be noted that the present invention could also be used to apply non-seed products to the field. For seed and non-seed products, the planting unit could be considered an application unit with an auxiliary hopper for holding product, a product meter for metering product received from the auxiliary hopper and an applicator for applying the metered product to a field. For example a dry chemical fertilizer or pesticide could be directed to the auxiliary hopper and metered by the product meter and applied to the field by the applicator.

The main frame 12 supports a main hopper 30 and an air pump 32. The air pump 32 is driven by a hydraulic motor; however other motor arrangements could be used, like electric motors for driving the air pump 32. The air pump 32 directs pressurized air to a manifold 34 through main air hose 36. The manifold 34 is formed from a hollow closed tubular support of the main frame 12. The manifold 34 is provided with a plurality of manifold outlets. Individual air supply lines 38 extend from the manifold outlets and direct pressurized air from the manifold 34 to the upstream side of the nozzle assembly 39. The nozzle assembly 39 is located at the bottom of the main hopper 30. Product located in the main hopper 30 flows by gravity to the nozzle assembly 39. The upstream side of the nozzle assembly 39 is provided with a number of air inlets 41 corresponding to the number of air supply hoses 38. The air inlets 41 are spaced transversely along the upstream side of the nozzle assembly 39. The downstream side of the nozzle assembly 39 is provided with a number of product outlets 43 corresponding to the number of air supply hoses 38. The product outlets 43 are also spaced transversely along the downstream side of the nozzle assembly 39. The product outlets 43 lie opposite from the air inlets 41. Each air inlet 41 is aligned with a respective product outlet 43. Product supply hoses 42 extend from the product outlets 43 to the individual auxiliary hoppers 18 for directing product entrained in the air stream to the auxiliary hoppers 18.

The nozzle assembly 39 is provided with a concave bottom 44 having outwardly diverging sidewalls 46. Product in the form of seed or non-seed product is placed in the main hopper 30 through a lid 48. Portions of the nozzle assembly 39 can be opened to form a cleanout door 48 as described in U.S. Pat. No. 6,609,468.

Each air inlet 41 and corresponding product outlet 43 are formed from two plastic parts. The two plastic parts are pinned together by integral pins formed on one of the parts and receiving apertures formed on the other. The air inlet 41 is angled downwardly relative to the concave bottom 44 and correspondingly the product outlet 43 is angled upwardly relative to the concave bottom 44. An integral baffle 58 extends between the air inlet 41 and the product outlet 43. The baffle 58 is peaked and is located above the air stream passing from the air inlet 41 to the product outlet 43. The downwardly angled air inlet 41 prevents product from backing up into the air supply hose 38, whereas the upwardly angled product outlet 43 prevents product from flowing into and clogging the product supply hose 42.

Adjacent air inlet 41/product outlet 43 combinations are transversely spaced from one another so that seed or non-seed product can pass on either side of the baffles 58 and puddle beneath the baffles 58. An air stream passing from the air inlet 41 to the product outlet 43 picks up product located in the puddle and directs it through product supply hose 42 to the auxiliary hopper 18. The transfer of product from the main hopper 30 to the auxiliary hoppers 18 is done automatically as product is needed by the auxiliary hopper 18.

As an individual auxiliary hopper 18 fills up with product, the auxiliary hopper product inlet 60 becomes covered by product blocking and slowing the air stream so that the air stream no longer picks up product in the main hopper 30 and transports the product to the auxiliary hopper 18. Conversely, as product is used up by the product meter 20, the auxiliary hopper product inlet 60 is uncovered and the air stream again picks up product for delivery to the auxiliary hopper 18. In this way the auxiliary hoppers 18 are always and automatically provided with product. The side walls of the auxiliary hoppers 18 are provided with screen vents 61 for venting air pressure in the auxiliary hoppers 18. The vent screens 61 can also be located in the lids of the auxiliary hoppers 18 as long as the vent screens 61 are above the respective product inlets.

In some situations product having large particles, like large seeds (corn and soybeans), are difficult for the air stream to pick up. To accommodate large seed, the air inlet 41 may be provided with an insert 62 having an air stream deflecting portion 64 that deflects a portion of the air stream downwardly to agitate the seed in the seed puddle and capture the seed in the air stream passing into the product outlet 43. The insert is provided with a locating tang 66 that engages a slot formed in the air inlet 41 to correctly orient the insert 62 and the air deflecting portion 64.

In other situations the seed or non-seed product may be too light and will be readily carried by even a small air stream. To overcome this problem the baffles 58 may be provided with an element 68. The element 68 can be clipped on to the baffles 58. The element has an obstructing bottom 70 that limits the amount of product exposed to the air stream. Element 68 is made of plastic and is provided with finger grips 72. By compressing the finger grips 72 the upper gap 74 is opened so that the clip can be clipped to the baffles 58.

Figure 10:
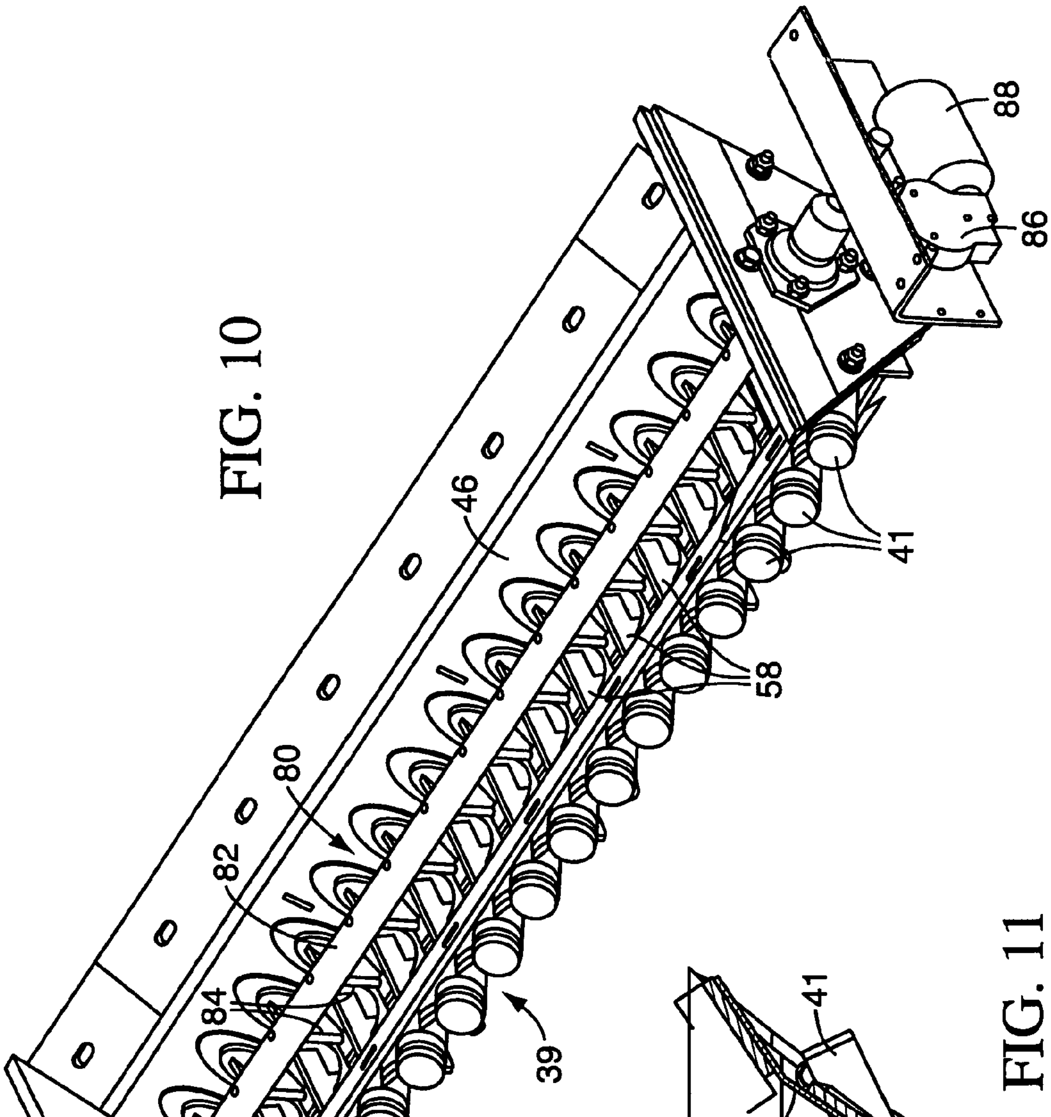
FIG. 10 is a front perspective view of the nozzle assembly being provided with an agitator assembly.

In an alternative embodiment, the large seed insert 62 can be eliminated in favor of an agitator assembly 80. The agitator assembly 80 comprises a transverse rod 82 extending across the nozzle assembly 39. The transverse rod 82 is provided with a plurality of radially extending fingers 84. As shown in FIG. 10 the fingers are transversely aligned with one another.

Figure 11:
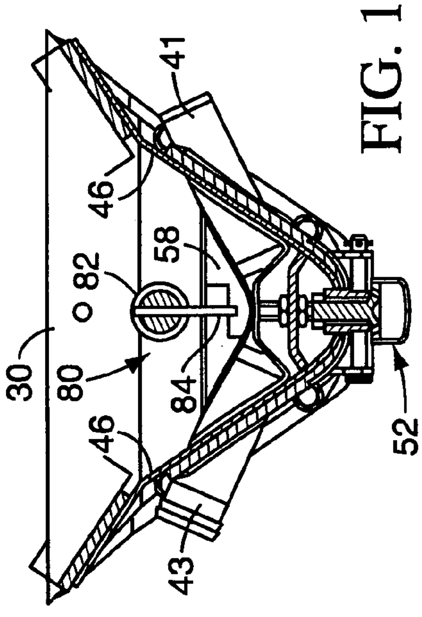
FIG. 11 is a cross sectional view of the nozzle assembly being provided with an agitator assembly.

The transverse rod 82 is rotated back and forth by a gearbox 86 being driven by a motor 88. At the bottom dead center position of the fingers 84 they extend between the individual nozzles defined by the aligned air inlets 41 and the product outlets 43. In this way the fingers 84 sweep the area between the nozzles. The gear box/motor assembly 86/88 drive the transverse rod fifty-one and one-half degrees in each direction from the bottom dead center illustrated in FIG. 11. As such, the fingers 84 sweep an arc of one-hundred three degrees.

Figure 12:
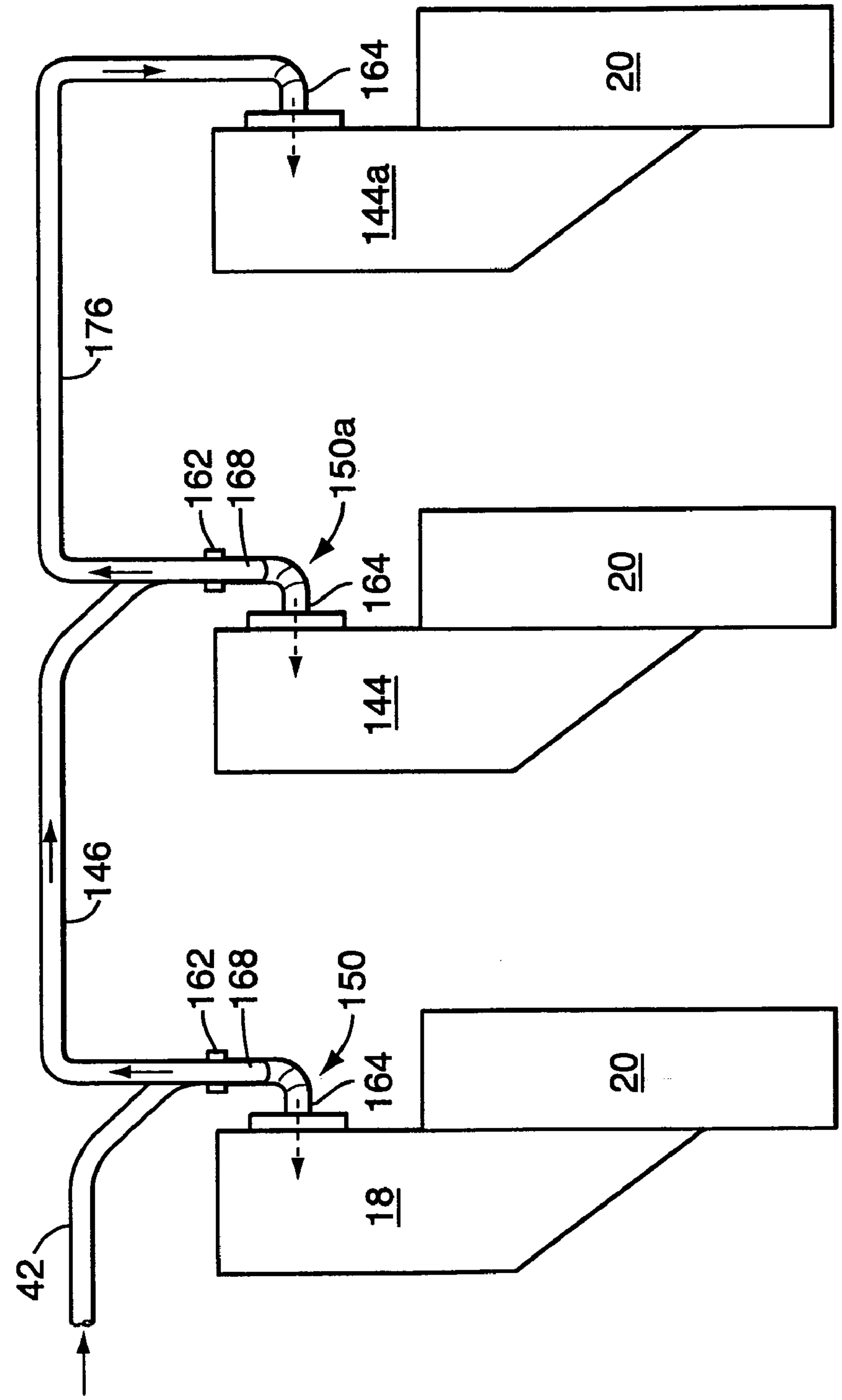
FIG. 12 is a fragmentary, diagrammatic section view taken generally along line 12—12 in FIG. 1.
Figure 13:
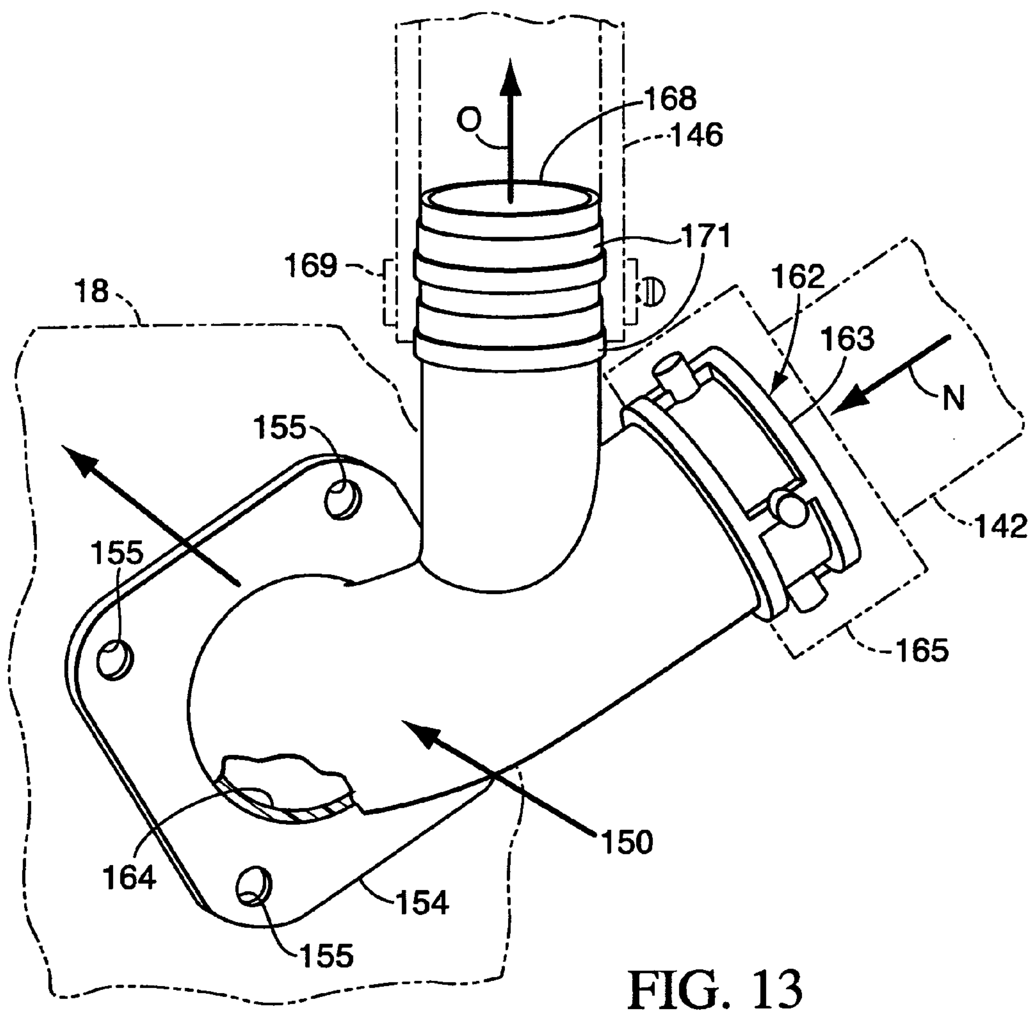
FIG. 13 is a perspective view of a portion of the product-on-demand delivery system shown in FIG. 12.
Figure 14:
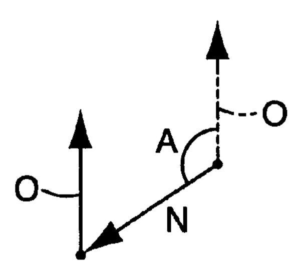
FIG. 14 is a vector diagram corresponding to the flow directions shown in FIG. 13.

FIGS. 12–14 illustrate an enhanced arrangement to the seeding machine 10 shown in FIG. 1.

The primary auxiliary hopper 18 is connected by product hose 42 to the manifold outlet as shown in FIG. 1. A secondary auxiliary hopper 144 is connected by a product hose 146 to the product hose 42 by a splitter fitting 150 in the form of a Y-shaped tube structure. The use of the terms "primary" and "secondary" connotes only the fill order in which the hoppers are located with respect to the main hopper and does not connote any difference in function.

The splitter fitting 150 is coupled to the primary auxiliary hopper 18 by use of a flange 154 and four fasteners (not shown) inserted through openings 155 (three shown) arranged in a rectangular pattern.

As illustrated in FIG. 13, the splitter fitting 150 has a splitter inlet 162 connected to the hose 42 (shown in phantom) by a quick connect coupling 163 engaged by a hose coupling 165 (shown in phantom), and a primary outlet 164. A portion of the fitting 150 is shown broken away for showing the primary outlet 164. The primary outlet 164 is coupled to the primary auxiliary hopper 18, and a secondary outlet 168 is coupled to the hose 146 (shown in phantom) using a hose clamp 169 (shown in phantom). The secondary outlet 168 can include hose engaging ribs 171 on an outside surface thereof. While the preferred embodiment is described and illustrated having two splitter outlets 164, 168, the invention also encompasses a splitter fitting having three or more outlets as well.

Preferably the splitter fitting 150 is located at the connection of the primary product hose 42 to the primary auxiliary hopper 18 as illustrated. Preferably, the inlet 162 and the outlet 164 form a 90 degree fitting angled slightly downwardly into the primary auxiliary hopper, and the outlet 168 forms a branch off the 90 degree fitting and extends substantially vertically.

The secondary product hose 146 can be connected at its outlet end to an identical Y-shaped tube structure 50*a* arranged at the secondary auxiliary hopper 144 wherein a further secondary product hose 176 can be connected at its inlet end to the identical fitting 150*a* and at its outlet end to a further secondary auxiliary hopper 144*a*. In this way, a plurality of auxiliary hoppers can be connected in series, "daisy chained," and all supplied through the same primary product hose 42.

The relative orientations of the splitter inlet 162 and the primary and secondary splitter outlets 164, 168 can be important. The present inventors have recognized exemplary performance when the secondary splitter outlet 168 is arranged at an obtuse angle A as defined by the angle between the flow velocity vector "N" of the air and product entering the splitter 150 and the flow and product velocity vector "O" exiting the splitter fitting 150 through the secondary splitter outlet 168. The definition of this angle is shown graphically in FIG. 14. The vector O has been transposed to the right (shown dashed) so that the vectors are connected end to end. An angle A of approximately 120 degrees has been found to be advantageous in preventing plugging of the secondary product hose.

By orienting the secondary splitter outlet 168 vertically and at the obtuse angle A, the flow must turn a sharp angle and slightly reverse itself to flow in the vertical orientation. This geometry helps to prevent blockage within the hose.

Figure 15:
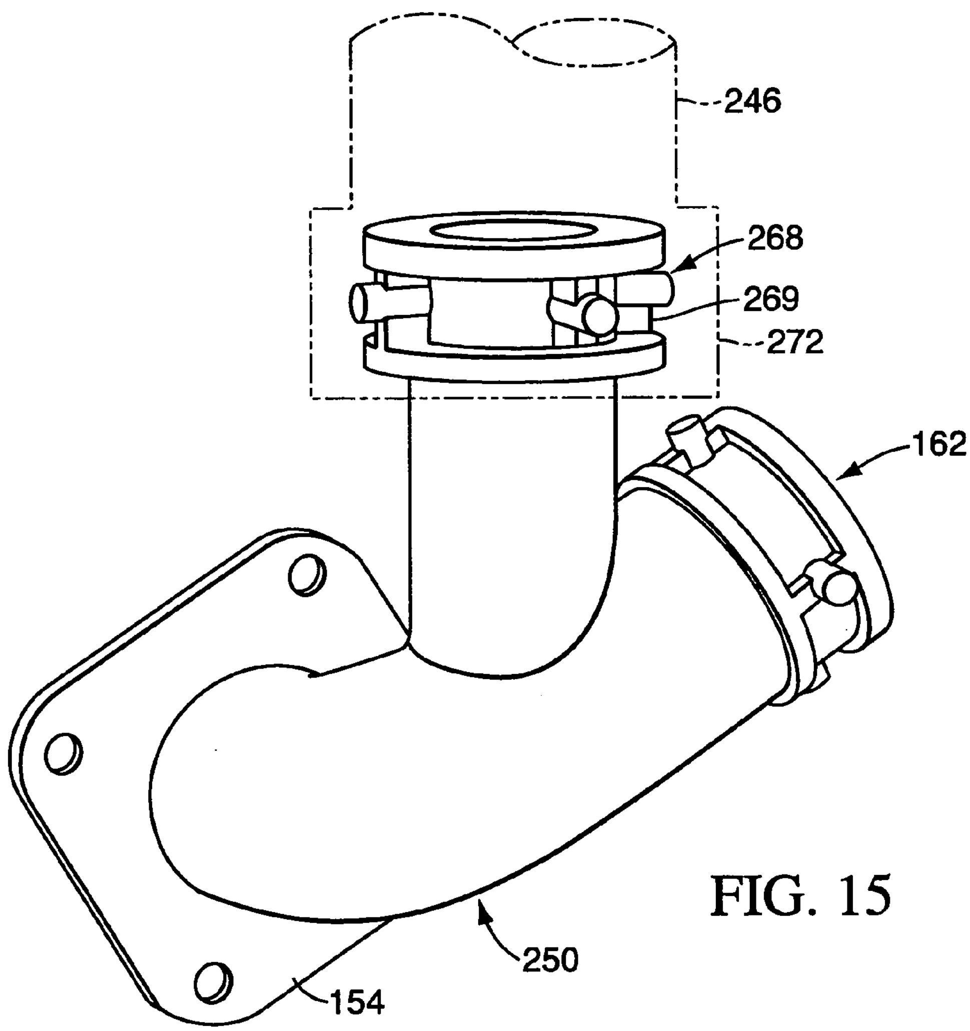
FIG. 15 is an alternate embodiment of the portion of the product-on-demand delivery system shown in FIG. 13.

FIG. 15 illustrates an alternate embodiment splitter fitting 250. A secondary outlet 268 can be coupled to a hose 246 (shown in phantom) using a quick connect coupling 269 formed on, or connected to, the outlet 268 and coupled to a corresponding hose coupling 272 (shown in phantom). The remaining aspects of the embodiment of FIG. 15 are identical to those of FIG. 13.

In comparison to the embodiment illustrated in FIG. 1, each nozzle outlet 43 can serve two or more application units 14. The invention of FIGS. 12–15 reduces the amount of space required at the bottom of the seed tank by allowing for the ganging of application units served by one primary product hose or by daisy-chaining or cascading product flows from one hopper to the next. A separate primary hose is not needed for each application unit.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A product-on-demand delivery system for agricultural product, the system comprising:

a frame;

a main hopper mounted on the frame, said main hopper having a nozzle assembly into which product in said main hopper is directed, the nozzle assembly having an upstream sidewall, a downstream sidewall and a bottom, the nozzle assembly comprising an air inlet and a product outlet;

a primary application unit and a secondary application unit mounted to the frame, each application unit provided with an auxiliary hopper and a product meter for dispensing the product to a field, each product meter in communication with the auxiliary hopper;

a splitter having a splitter inlet, a first splitter outlet and a second splitter outlet, said second splitter outlet oriented for a vertical upward flow of air and product;

a primary product hose flow-coupled to said product outlet and to said splitter inlet;

a secondary product hose flow-coupled to said primary product hose and to said secondary application unit;

said first splitter outlet flow-coupled to said primary application unit;

an air pump pneumatically flow-coupled to the upstream sidewall of the nozzle assembly by an air supply hose, the air pump generating pressurized air directed into the air supply hose;

the air supply hose being flow-coupled to said air inlet of the nozzle assembly opposite the product outlet, so that product located in the nozzle assembly is taken up by the air stream as the air stream passes from the air inlet through the nozzle assembly to the product outlet, and the air and product passes through the primary product hose, through the splitter to the primary application unit and through the splitter and through the secondary product hose to the secondary application unit, air and product supplying both said primary and secondary application units passing through said primary product hose.

2. A product-on-demand delivery system as defined by claim 1, wherein said second splitter outlet is arranged to direct flow therethrough in a direction having a velocity vector at an obtuse angle with respect to a velocity vector of flow through said splitter inlet.

3. A product-on-demand delivery system as defined by claim 2, wherein the nozzle assembly comprises a baffle, the baffle extending between and above the air inlet and the product outlet of the nozzle assembly.

4. A product-on-demand delivery system as defined by claim 3, comprising an agitator assembly located in the nozzle assembly for agitating product located in the nozzle assembly, wherein the agitator assembly is provided with a plurality of fingers that are movable to agitate product within said nozzle assembly.

5. A product-on-demand delivery system as defined by claim 3, comprising an agitator assembly located in the nozzle assembly for agitating product located in the nozzle assembly, wherein the agitator comprises a transverse rod that is located above the baffles, the transverse rod having a plurality of fingers extending radially outward from the transverse rod, wherein the transverse rod is rotated back and forth so that the plurality of fingers agitate the product located in the nozzle assembly.

6. A product-on-demand delivery system for agricultural product, said system comprising:

an implement frame that can be transported through a field;

a main seed hopper mounted on the frame, the main hopper having a nozzle assembly into which product in the main hopper is directed by gravity, the nozzle assembly having an upstream sidewall with an air inlet thereon, a downstream sidewall and a bottom;

a plurality of planting units are mounted to the frame, each planting unit is provided with a seed meter for metering seed and a furrow opener for forming a planting furrow into which metered seed is deposited, wherein a first planting unit of said plurality of planting units comprises a first seed meter that is flow-coupled to the main seed hopper by a primary product hose, that is flow-coupled to the downstream sidewall of the nozzle assembly, wherein a second planting unit of said plurality of planting units comprises a second seed meter that is flow-coupled to the primary product hose by a secondary product hose that branches from the primary product hose, said secondary product hose branches from the primary product hose at an angle such that a flow velocity vector through the primary product hose at an intersection of primary and secondary product hoses is at an obtuse angle to a flow velocity vector of product through the secondary product hose at the intersection of the primary and secondary product hoses;

an air pump pneumatically flow-coupled to the nozzle assembly by an air supply hose, the air pump generates an air stream that is directed into the air supply hose, the air supply hose being flow-coupled to said air inlet on the upstream sidewall of the nozzle assembly opposite the primary product hose, so that the air stream passes from the air inlet, through the nozzle assembly, to the primary product hose, so that seed located in the bottom of the nozzle assembly is taken up by the air stream and is directed through the primary product hose to the first seed meter, and from the secondary product hose to the second seed meter.

7. A product-on-demand delivery system as defined by claim 6, wherein said first planting unit comprises a first auxiliary seed hopper flow-coupled between the primary product hose and said first seed meter; and said second planting unit comprises an auxiliary seed hopper flow-coupled between the secondary product hose and said second seed meter.

8. A product-on-demand delivery system as defined by claim 7, wherein the nozzle assembly comprises a product outlet, wherein said primary product hose is connected to said product outlet, and a baffle extending between and above the air inlet and the product outlet so that the air stream from the air supply hose pass beneath the baffle.

9. A product-on-demand delivery system as defined by claim 8, wherein said secondary product hose extends substantially vertically at said intersection of said primary and secondary product hoses.

10. A product-on-demand delivery system as defined by claim 9, wherein an agitator assembly is located in the nozzle assembly for agitating seeds located in the nozzle assembly, wherein the agitator comprises a transverse rod that is located above the baffle, the transverse rod having a plurality of fingers extending radially outward from the transverse rod, wherein the plurality of fingers are transversely aligned on the transverse rod, and wherein the transverse rod is rotated back and forth so that the fingers agitate the product located in the nozzle assembly.

11. A product-on-demand delivery system for agricultural product, said system comprising:

an implement frame that can be transported through a field;

a main seed hopper mounted on the frame, the main seed hopper having a nozzle assembly with a concave bottom and an upstream sidewall and a downstream sidewall, the upstream sidewall and the downstream sidewall are outwardly diverging from one another, product in the main hopper is directed to the bottom of the nozzle assembly by gravity, the upstream sidewall having an air inlet and the downstream sidewall having a product outlet;

a plurality of planting units are mounted to the frame, each planting unit is provided with an auxiliary hopper, a seed meter and a furrow opener for forming a planting furrow into which metered seed is deposited;

a plurality of splitters each having one splitter inlet, a first splitter outlet and a second splitter outlet, each second splitter outlet of said splitters flow-coupled to an inlet end of a secondary product hose and each first splitter outlet flow-coupled to an auxiliary hopper, one splitter inlet flow-coupled to the product outlet, and remaining splitter inlets each flow-coupled to an outlet end of a secondary product hose of a splitter that is upstream in a product flow direction;

an air pump is pneumatically flow-coupled to the nozzle assembly by an air supply hose, the air pump generates an air stream that is directed into the air supply hose, said air supply hose is flow-coupled to said air inlet on the upstream sidewall of the nozzle assembly opposite the product outlet, so that the air stream passes from the air inlet through the nozzle assembly and through the product outlet, so that seed located in the bottom of the nozzle assembly is taken up by the air stream and is directed through the product outlet to said one splitter inlet.

12. A product-on-demand delivery system as defined by claim 11, wherein each second splitter outlet is arranged to direct flow therethrough in a direction having a velocity vector at an obtuse angle with respect to a velocity vector of flow through said respective splitter inlet, and each second splitter outlet oriented for a vertical upward flow of air and product.

13. A product-on-demand delivery system as defined by claim 11, wherein the nozzle assembly comprises a baffle that extends between and above the air inlet and the product outlet so that the air stream from the air supply hose passes beneath the baffle.

14. A product-on-demand delivery system as defined by claim 11, wherein an agitator assembly is located in the, nozzle assembly for agitating seeds located in the nozzle assembly, wherein the agitator assembly comprises a transverse rod, the transverse rod having a plurality of fingers, the plurality of fingers extend radially outward from the rod to reach seed located in the nozzle assembly.

15. A product-on-demand delivery system for agricultural product, said system comprising:

a frame;

a main hopper mounted on the frame, the main hopper having an air nozzle to which product in the main hopper is directed, an air stream through said air nozzle entraining product therein;

a splitter having a splitter inlet and first and second splitter outlets, said splitter inlet communicating with said nozzle;

a primary product hose and a secondary product hose;

said primary product hose flow-coupled to said splitter inlet;

a primary application unit and a secondary application unit, both mounted to the frame, said primary application unit comprising a first product meter for applying the product to a field, said first product meter being flow-coupled to the nozzle by said primary product hose, said splitter inlet and said first splitter outlet; and said secondary application unit comprising a second product meter for applying the Product to the field, said second product meter being flow-coupled to the primary product hose by said secondary product hose connected thereto at said second splitter outlet, said second splitter outlet connected at an angle to the splitter inlet such that a product flow velocity vector in the splitter inlet is at an obtuse angle to a flow velocity vector of product flowing through said second splitter outlet.

16. A product-on-demand delivery system as defined by claim 15, wherein said second splitter outlet is oriented for a vertical upward flow of air and product.

17. A product-on-demand delivery system as defined by claim 15, wherein said primary application unit comprises a first auxiliary hopper flow-coupled between said first splitter outlet and said first product meter; and said secondary application unit comprises a second auxiliary hopper flow-coupled between said secondary product hose and said second product meter.

18. A product-on-demand delivery system as defined by claim 15, wherein an agitator assembly is located in the main hopper for agitating product located in the main hopper, and wherein the agitator comprises a transverse rod, the transverse rod having the plurality of fingers extending radially outward from the transverse rod, wherein the transverse rod is rotated back and forth so that the fingers agitate the product located in the main hopper.

* * * * *